Patented Jan. 26, 1932

1,842,772

UNITED STATES PATENT OFFICE

ZOLTÁN von VERESS, OF BUDAPEST, HUNGARY, ASSIGNOR OF ONE-HALF TO RUDOLF von KREYBIG, OF BUDAPEST, HUNGARY

GLASS

No Drawing. Application filed October 22, 1928, Serial No. 314,544, and in Hungary October 25, 1927.

The invention relates to the manufacture of glasses having the properties of porcelain and being adapted to replace same.

It is known that when glasses of ordinary composition, e. g. calcium soda glass, have been kept for 24 to 48 hours at the softening temperature, and then very slowly cooled, a kind of crystallization is observed to have taken place. After the cooling the crystalline (acicular) structure of the glass thus treated can be clearly recognized and consequently the glass appears more or less cloudy. It has been tried to utilize this phenomen in the manufacture of the so-called Réaumur-porcelain. But on the one hand the suitable regulation of the crystallization process and of the consequent simultaneous clouding of the glass could not be effected, even with glasses of one and the same kind; neither, on the other hand was the quality of the product obtained satisfactory in other respects.

It has now been found that by melting together alkaline earth oxides, e. g. calcium oxide and magnesium oxide, with silica, a completely porcelain-like product can constantly be obtained. This product is of a pure white colour, and, like real porcelain, only translucent in very thin layers. It is, further, of conchoidal fracture, considerably harder but less brittle than ordinary glass. In manufacturing, it is not necessary to keep the glass long at the softening temperature. The whiteness and opacity of the glass obtained is due to the amorphous separation of the excessive silica. According to observation, this amorphous separation takes place between 700 and 800° C.

The amorphous separation of the silica is prevented if the slightest quantity of alkali is present. Experiments have shown that the regulation of the amorphous separation can be rendered impossible by the presence of only about 3% of an alkali, and the quality of the product then obtained is not satisfactory.

As raw materials dolomite and quartz sand may preferably be used. The proportion of the lime and the magnesia to one another can vary within wide limits without substantially influencing the quality of the product. As regards the silica content, 60% has been found to be the lower limit permitting a suitable amorphous separation, while with a $SiO_2$ content amounting to about 70% the melting point of the mass is too high.

A composition assuring industrial workability can vary within the following limits:

| | Per cent |
|---|---|
| MgO | 4–21 |
| CaO | 13–32 |
| $SiO_2$ | 60–70 |

With regard to melting, it may be stated that the product, while requiring a somewhat higher temperature to make it plastic than ordinary glass does, on the other hand becomes thinly liquid at a much lower temperature. Accordingly, the range of temperature in which the working is to be done is smaller.

As for the rest the course of manufacture is substantially the same as with ordinary glass, and also in working, staining, painting, etc. the usual processes can be employed. In general the substances usually added in glass manufacture can be used, with the exception of alkalis. The presence of the substances, which tend to soil the colours, and are mostly contained in the raw materials, has a less injurious effect than in ordinary glass. The porcelain-like glass according to the invention retains its pure white colour even when the quantity of soiling substances is four times as much, as is allowable in ordinary glass. Accordingly, when the product is to be stained or coloured, it requires a considerably greater quantity of the staining substances than ordinary glass.

The porcelain-like product obtained is the more adapted to replace porcelain in the manufacture of industrial articles—as, for instance, of the cup-, ring- and other insulators used in electrotechnics, of cups, plates, Dutch tiles and the like—as it can be manufactured considerably more cheaply.

Various changes may be made in the details disclosed in the foregoing specification without departing from the invention or sacrificing the advantages thereof.

I claim:—

1. A glass free from alkali, having the appearance of porcelain, composed of 60 to 70 per cent of silica, and 40 to 30 per cent of alkaline earth oxides.

2. A glass free from alkali, having the appearance of porcelain, composed of 13 to 32 per cent of calcium oxide, 4 to 21 per cent of magnesium oxide, and 60 to 70 per cent of silica.

3. A glass batch for the manufacturing of a glass having the appearance of porcelain, consisting of silica and dolomite.

In testimony whereof I affix my signature.

ZOLTÁN von VERESS.